Jan. 9, 1923.
I. A. SIBLEY, Jr.
AUTOMOBILE BUMPER.
FILED AUG. 17, 1921.
1,441,637.
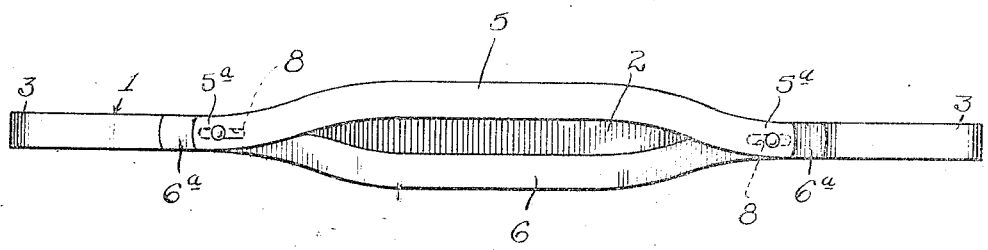
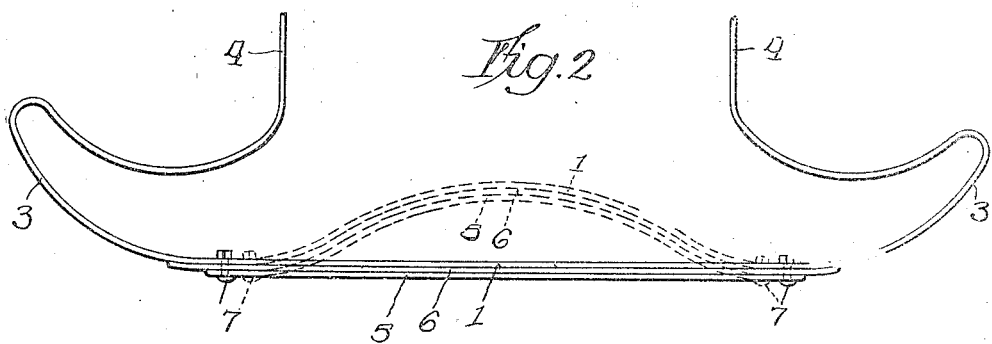
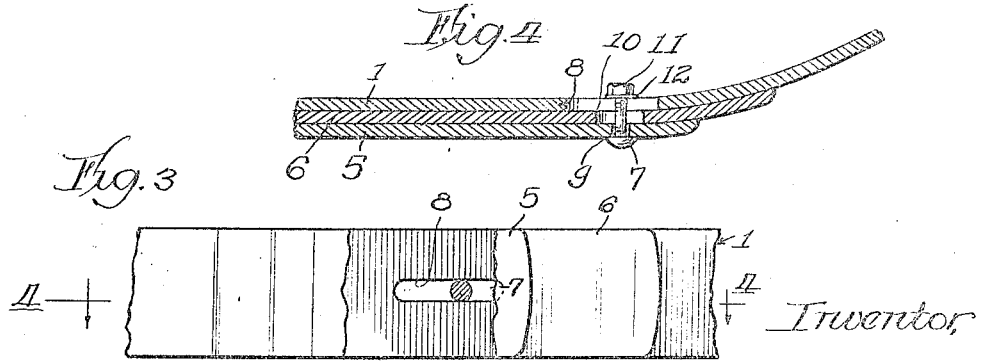
Inventor,
Irving A. Sibley Jr.

Patented Jan. 9, 1923

1,441,637

UNITED STATES PATENT OFFICE.

IRVING A. SIBLEY, JR., OF CHICAGO, ILLINOIS.

AUTOMOBILE BUMPER.

Application filed August 17, 1921. Serial No. 492,978.

*To all whom it may concern:*

Be it known that I, IRVING A. SIBLEY, Jr., a citizen of the United States, and a resident of Chicago, in the county of Cook and State of Illinois, have invented certain new and useful Improvements in Automobile Bumpers, of which the following is a specification.

This invention relates to improvements in automobile bumpers, and more particularly to a bumper of the resilient bar type, and further characterized by the provision of an increased impact area thruout the central portion thereof.

A bumper embodying this invention is preferably constructed of a single resilient bar bent into a form to provide a forwardly disposed impact bar and rearwardly extending arms for attaching the bumper to the vehicle frame members. The increased impact area is provided by the attachment to the single bar referred to, of a pair of short auxiliary bars offset above and below the horizontal plane of said single bar.

As will be presently pointed out, the auxiliary bars overlap each other, and the single bar, at their ends, so that a thickness of metal equivalent to that of three bars is present at the points of connection, this thickness being measured transversely of the plane in which bending or flexing takes place when a blow is received against the impact member. Altho any suitable means may be employed for attaching the auxiliary bars to the single or main bar, as it may be determined, such as bolting or clamping, the former is preferred, inasmuch as a more flexible connection can be made to permit a certain and necessary degree of endwise shifting movement between the overlapping ends of the several bars, as the bars are distorted under the force of impact.

The object, therefore, of the invention, is to incorporate in a bumper structure an arrangement or connection of the parts which will provide that degree of flexibility which will enable the same to withstand repeated blows without weakening or damaging the parts, and particularly those which join the several bars together.

The advantages of the construction will be more clearly set forth in the following description, which refers to the accompanying drawing in which Fig. 1 is a view in front elevation of the bumper, Fig. 2 is a top plan view of the bumper showing the effect of impacts upon the bumper, Fig. 3 is an enlarged detailed view in front elevation of sections of the bars at the point of connection, and Fig. 4 is a sectional view corresponding to Figure 3, as taken on line 4—4 of Figure 3.

The general structure of the bumper has been suggested; namely, that of a single resilient bar 1 bent to form a straight portion 2, forming the front impact section thereof, and U-shaped end sections 3—3 together with rearwardly extending arms 4—4 adapted for attachment to the frame of the automobile. Secured to the straight portion 2 of the bar 1 are the auxiliary bars 5 and 6, the same being shaped or bent transversely to provide portions intermediate their ends which are offset from the bar 1 when the ends $5^a$ and $6^a$ respectively are applied flatwise against said bar 1. The auxiliary bars are offset in opposite directions so that the bar 5 is above the plane of the bar 1, and the bar 6 below the plane thereof. Furthermore, the lower auxiliary bar 6 is slightly longer than the companion bar 5, and bears against the bar 1, the other bar 5 in turn bearing flatwise against the ends thereof, its extremities terminating short of the ends of said bar 6.

The means of connection between the bars are bolts 7 which pass thru the overlapping and contacting portions of the bars in the following manner: Formed in the lower bar 1 at the points of connection are longitudinally elongated slots 8 so positioned that the bolt 7 engages midway the ends thereof, when the parts are in normal position. Within the end portions $5^a$ and $6^a$ respectively of the auxiliary bars 5 and 6 are formed bolt holes 9 and 10 registering with each other and with the outer end portion of the slot 8, when the bars are in normal position.

Altho the holes 9 and 10 of the bars 5 and 6 may be ordinary bolt holes, the hole 9 in the intermediate bar 6 may also be elongated, but somewhat shorter in length than the slot 8 of the main bar as shown in Figure 4.

The bolt is inserted thru the registering holes and slots from the front side of the bumper, and secured in place by means of a nut 11 and a washer 12 bearing against the rear face of the main bar 1 in the usual manner.

In Figure 2 has been illustrated a somewhat exaggerated representation of the distortion which takes place in the bars under the force of an impact delivered at the central point of the bumper. Clearly, the main bar is distorted the greater amount, and the auxiliary bars in proportion to their transverse distance from the main bar. Thus the tendency under impact is to decrease the distance between the bolts 7—7, the result being that the bars slide relatively to each other, and the bolts 7 are displaced relative to all bars except the outermost one 5, which undergoes the least distortion. The result is a movement of the bolt within the slots 8—8 of the main bar toward the outer ends thereof, and a corresponding less movement within the elongated hole 10 of the intermediate bar 6. Thus while the bars are firmly secured together in normal position of the bumper, it is manifest that under impact the ends of the bars are sufficiently flexible to afford the necessary degree of relative displacement under impact. Without this provision the bolts would soon be sheared off and the auxiliary bars become disconnected.

This form of connection is therefore advantageous in that it provides a flexible yet secure assembly of the bumper parts, thus increasing the life and efficiency of the structure.

Having described a preferred embodiment of the invention, I claim as new and novel:

1. An automobile bumper comprising a resilient bar extending throughout the impact portion thereof, auxiliary bars secured at their ends to said resilient bar, and connecting members extending through registering slots formed in said bars and increasing in length from the outer to the innermost bar.

2. An automobile bumper comprising a main resilient bar extending the length of the impact portion thereof, auxiliary bars applied in flatwise contact to said main bar, and bolts extending through the ends of said auxiliary bars, and said main bar, said slots being increased in length from the outer to the innermost bar.

In witness whereof, I hereunto subscribe my name this 15th day of August, A. D., 1921.

IRVING A. SIBLEY, Jr.